(12) United States Patent  
Winkel et al.

(10) Patent No.: US 8,715,137 B2
(45) Date of Patent: May 6, 2014

(54) METHOD FOR CONTROLLING AN AUTOMATIC TRANSMISSION OF A MOTOR VEHICLE

(71) Applicant: ZF Friedrichshafen AG, Friedrichshafen (DE)

(72) Inventors: Matthias Winkel, Weingarten (DE); Thomas Jager, Meckenbeuren (DE); Roland Mair, Tettnang (DE); Reiner Kneer, Nonnenhorn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/944,926

(22) Filed: Jul. 18, 2013

(65) Prior Publication Data

US 2013/0303332 A1    Nov. 14, 2013

Related U.S. Application Data

(62) Division of application No. 12/669,108, filed as application No. PCT/EP2008/058576 on Jul. 3, 2008, now Pat. No. 8,512,205.

(30) Foreign Application Priority Data

Jul. 27, 2007   (DE) .................. 10 2007 035 297

(51) Int. Cl.
    *F16H 61/16*    (2006.01)
(52) U.S. Cl.
    USPC ........................................... 477/125
(58) Field of Classification Search
    USPC ................................. 477/901, 125
    See application file for complete search history.

(56) References Cited

U.S. PATENT DOCUMENTS

| | | | |
|---|---|---|---|
| 4,208,925 A | | 6/1980 | Miller et al. |
| 4,829,852 A | * | 5/1989 | Sakakiyama ................ 477/138 |
| 4,858,498 A | | 8/1989 | Bouda |
| 5,050,456 A | | 9/1991 | Fukuda |
| 5,605,519 A | | 2/1997 | Seidel et al. |
| 5,680,307 A | | 10/1997 | Issa et al. |
| 5,919,244 A | | 7/1999 | Danz et al. |
| 6,030,315 A | | 2/2000 | Bellinger |
| 6,035,735 A | | 3/2000 | Graf et al. |
| 6,275,760 B1 | | 8/2001 | Saito et al. |
| 6,363,805 B1 | | 4/2002 | Marchart |
| 6,412,361 B1 | | 7/2002 | Wolf et al. |
| 6,490,516 B1 | | 12/2002 | Henneken et al. |

(Continued)

FOREIGN PATENT DOCUMENTS

| | | | |
|---|---|---|---|
| DE | 41 20 603 A1 | | 1/1993 |
| DE | 41 30 265 A1 | | 3/1993 |

(Continued)

*Primary Examiner* — Dirk Wright

(74) *Attorney, Agent, or Firm* — Davis & Bujold, PLLC; Michael J. Bujold

(57) ABSTRACT

A method of controlling an automatic transmission of a vehicle in which a hold gear function is activated by a driver request and deactivated depending on a return condition. The method comprises the step of (a) determining the return condition by a change in operating state, and (b) deactivating the hold gear function if a temporary operating state, for which the hold function is requested, ends and a change takes place between one of uphill driving and downhill driving and between driving one of up and down a hill and driving on a same plane.

6 Claims, 1 Drawing Sheet

(56) References Cited

U.S. PATENT DOCUMENTS

| | | |
|---|---|---|
| 6,519,522 B1 | 2/2003 | Wolf et al. |
| 6,527,672 B1 | 3/2003 | Henneken et al. |
| 6,622,581 B2 | 9/2003 | Seidel et al. |
| 6,879,900 B2 | 4/2005 | Henneken et al. |
| 6,885,929 B2 | 4/2005 | Stragapede |
| 6,953,410 B2 | 10/2005 | Wheeler et al. |
| 7,001,308 B2 | 2/2006 | Henneken et al. |
| 7,066,862 B2 | 6/2006 | Bothe et al. |
| 7,367,922 B2 | 5/2008 | Gueter |
| 8,512,205 B2 * | 8/2013 | Winkel et al. ............... 477/115 |
| 2004/0073348 A1 | 4/2004 | Stragapede |
| 2005/0026746 A1 | 2/2005 | Stine et al. |
| 2006/0063640 A1 | 3/2006 | Doctrove |
| 2006/0276950 A1 | 12/2006 | Wild et al. |
| 2007/0232441 A1 | 10/2007 | Gueter |

FOREIGN PATENT DOCUMENTS

| | | |
|---|---|---|
| DE | 43 25 296 A1 | 2/1995 |
| DE | 197 33 464 A1 | 2/1998 |
| DE | 198 49 057 A1 | 4/2000 |
| DE | 198 49 059 A1 | 4/2000 |
| DE | 100 55 957 A1 | 5/2002 |
| EP | 0 353 310 A1 | 2/1990 |

* cited by examiner

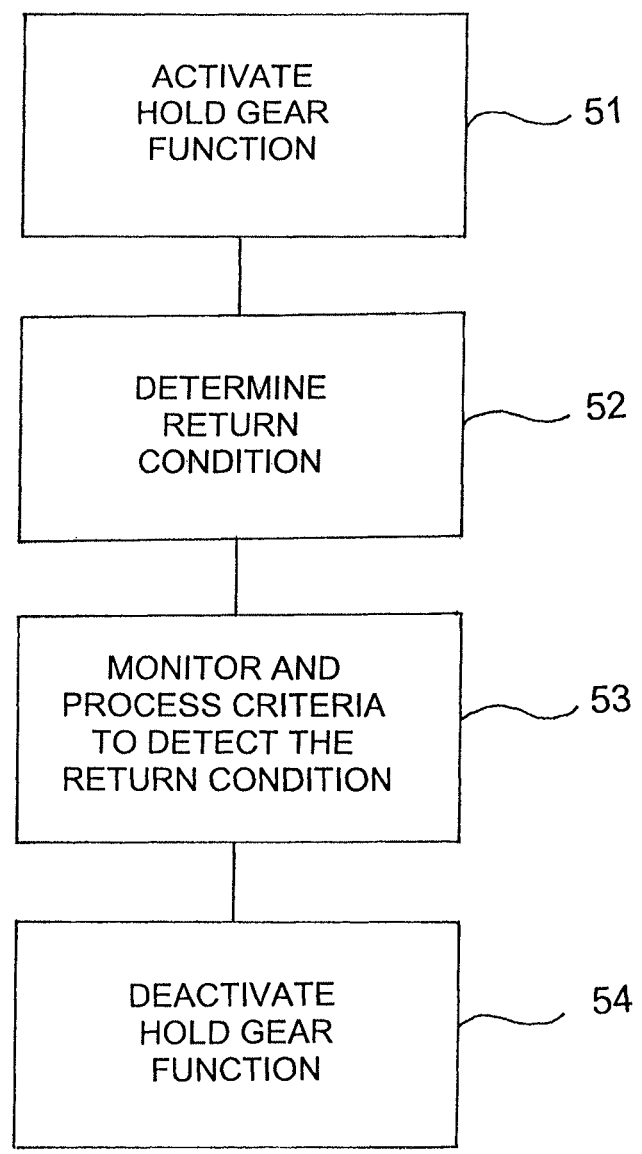

METHOD FOR CONTROLLING AN AUTOMATIC TRANSMISSION OF A MOTOR VEHICLE

This application is a divisional of U.S. patent application Ser. No. 12/669,108 filed Jan. 14, 2010, which is a National Stage completion of PCT/EP2008/058576 filed Jul. 3, 2008, which claims priority from German patent application serial no. 10 2007 035 297.4 filed Jul. 27, 2007.

FIELD OF INVENTION

The invention concerns a method for controlling an automatic transmission of a vehicle. The term automatic transmission includes all transmissions, changing automatically their gear ratio, as well as automatic shifting transmissions and continuously variable transmissions.

BACKGROUND OF THE INVENTION

The function "hold gear" with automatic transmissions in drive trains of motor vehicles is already known. Hereby, when in automatic transmission mode, an actually intended gear change is prevented and a currently used gear, or selected gear, respectively, will be maintained. To meet a driver's intended selection, the function can be activated, in principle, through a control device and analysis algorithms, either automatically or manually through a direct request from the driver.

Known control systems with automatic activation of the function use the temporary retention of a gear as part of the transmission control program, for example, to arrange for an individual style of driving, like a mainly sporty or mainly economical driving style. DE 197 33 464 B4 and DE 43 25 296 A1 can be mentioned as examples. Hereby, the function "hold gear" will automatically be activated or deactivated. Although these methods can recognize a driver specific handling, they are, however, limited in reacting to changing drive situations and in anticipating the driver's observations while driving, and to initiate, based on a current situation, the function "hold gear".

In the function "hold gear", requested and initiated by the driver, below used as term "Hold Current Gear" or simply as hold gear function, the driver is given the option, to stop directly automatically initiated or computed gear shifting by the transmission control, meaning to keep a currently selected gear, as opposed to change the gear, as arranged by the transmission control.

The background here is that, due to the driver's observations, knowledge of specific road conditions or other secondary factors can be obtained, which would not require a gear shifting, or which might be disadvantageous to the actual operating condition, respectively. It can happen, for example, when going uphill, downhill, during stop and go traffic, in rough terrain, or when maneuvering.

The driver can usually signal the request "hold current gear" to the transmission control, in the typical manner through an operator's control element. Control elements, which display the particular gear condition directly through, for example, a snap-in key at the drive switch, or indirectly through a display, the function can remain active as long as the vehicle, or the drive train respectively, work within an allowed operating range, or what the control element displays, respectively. It is then up to the driver, by activating the switch, to terminate the function at a given time. With switches, which activate the hold gear function but do not explicitly display the function, for example a non snap-in key switch, an obligatory feedback operation is provided in the transmission control, through which the hold gear function is terminated.

In most cases, it will be bothersome to the driver to deactivate the selected function through the operator's control element, after the reason for the selection of an activation disappears, at the latest after a request through a display when changing the gear's allowed range, and again the need for the activation of the control key, or to unlock the snap-in key, respectively. It addition, this might be unnecessarily distractive in regard to the actual driving situation. In other situations, it might be absolutely necessary to have the transmission control to intervene and to terminate the hold gear function, to guarantee a regular drive condition, or to exclude an excessive wear, or in the extreme to avoid damage to the transmission, or other damage to the drive train, respectively. Therefore and in principle, it is more comfortable and suitable to provide a feedback operation, when terminating a hold gear condition and returning to the automatic transmission mode of the transmission control software.

It is known to prearrange the return to the automatic drive operation, chronologically after passing a fixed time span. This very simple criterion does not always make sense or is sufficient, since the request to return to the automatic drive condition can already be made, for instance, when the vehicle is standing still and while waiting a certain time period for starting the vehicle. Examples here are the stop at a traffic light or an intersection, or the boarding or release of passengers at a bus stop. In these cases, the time limitation of the function would at least partially pass, or going nowhere, respectively, without the vehicle being in the particular and expected drive situation, which was initiated by the hold gear request. Such a situation, where the hold gear request was performed, can be, as an example, an uphill slope lying ahead. A similar situation would occur during a stop-and-go drive at a slope; the function could be terminated before the slope would have been passed. Therefore, the use of a fixed time interval is rather imperfect as a return condition.

SUMMARY OF THE INVENTION

Based on this background, the invention's task is to present a method for controlling a vehicle's automatic transmission, which, upon the driver's request for a hold gear function, provides a return condition, which always allows an effective, safe to operate, a comfortable use, and termination of the hold gear function.

The invention is based on the knowledge that a transmission's control with a flexible return condition, the return from a driver's request for a hold gear mode, is largely more effective than a fixed return condition. Especially, a return condition which is adoptable to a certain operating situation or drive situation, as opposed to a return condition with a fixed time interval, the hold gear function can be maintained as long as it makes sense or it is advantageous. Compared to a manual return which can be only performed by the driver, a flexible return condition offers extended, automated termination options, and therefore a more comfortable and targeted use of the hold gear function.

Therefore, the invention concerns a method of controlling an automatic transmission of a vehicle, in which, with reference to the FIGURE, the hold gear function is activated by a driver's request (step S1) and is deactivated, depending on the return condition.

In addition, the invention also provides that the return condition is determined (step S2) by the following criteria:

a.) A flexible time interval under consideration of the vehicle's stop times, b.) A rotational speed of a vehicle's drive motor, or one or more parameters, correlating with the engine's rotational speed, c.) A new driver's request, same or similar request, d.) A change of the vehicle's operating condition, and e.) A plausibility check with consideration of a start-up procedure.

As initially mentioned, the term automatic transmission covers all transmissions which change the gear ratio automatically, for example also variable transmissions with automatic gear changes. The hold gear function is meant as maintaining a transmission gear ratio.

The invention proposes advantageously the use of a variable return condition, which preferably is established through suitable processing and control algorithms, as part of an existing transmission control unit. Hereby, relevant sensor data are captured and also used, insofar required, and also certain criteria are monitored and processed (step S3) with the intention to accurately terminate the temporary hold gear function (step S4), if its particular request purpose has been met and/or a continuous use of the selected gear could have disadvantageous consequences. Hereby, the individual driver's request will be complied as far as possible. Below, the invention's method is further explained through preferred embodiments.

BRIEF DESCRIPTION OF THE DRAWINGS

An embodiment of the invention is described in more detail, without being restricted thereto, based on the sole FIGURE which shows a diagrammatical representation of the method of controlling an automatic transmission of a motor vehicle according to the invention.

DETAILED DESCRIPTION OF THE PREFERRED EMBODIMENTS

According to a first preferred embodiment of the method, the time span of the hold gear function is only running when the vehicle is moving. Hereby, the previously mentioned standstill periods do not influence the function. To also cover the stop-and-go condition, it is advantageous to not only stop a timer during that time span of the hold gear function at standstill, but also to reset it (to Zero). Hereby, the predefined time span becomes an effective net time of the hold gear function when driving, followed by automatic termination of the function.

Instead of such a time criterion or, if necessary, a combination with such a time criterion, relevant drive criteria can provide an even more variable and more accurate return condition. It is especially advantageous to make use of the transmission's rotational speed, force-locked with the combustion engine, and related criteria, for the determination of the return condition.

In can therefore be provided to automatically deactivate the hold gear function, when a predetermined and drive relevant, upper threshold value is exceeded, or when a predetermined and drive relevant, falls below the lower threshold value.

Such a drive relevant threshold value can advantageously be a certain rotational speed of the combustion engine which is connected with the transmission. For example, an upper threshold value can be exceeded, if the motor's rotational speed gets close to a provided electronic power reduction limit of the motor, meaning when a power surplus is available. In the lower rotational speed range, a lower threshold value can only fall below, if the engine's rotational speed gets close to the idling rotational speed, meaning that the drive torque is not sufficient anymore to maintain the rotational speed. In these cases, it is not appropriate to keep the actual selected gear, so that the transmission, without the driver's involvement, returns to the automatic gear shift mode.

Analogously, the engine's rotational speed can also be substituted by other signals which describe the engine's rotational speed. In particular, the transmission's input rotational speed, the transmission's output rotational speed, weighted with the corresponding gear ratio of the selected gear, or the vehicle's speed, weighted with a corresponding transmission, wheel, and axle drive ratio conversion factor. From these parameters, threshold values can also derive for the return condition, as mentioned above.

The mentioned rotational speed limits or threshold values, respectively, can also be adjusted, depending on the driver's request, acknowledged and signaled as an activated throttle pedal, an activated brake pedal, or an activated, secondary brake. Hereby and in particular, the case of pull operation (driving up hill or driving on a same level, respectively) can be dealt with separately as from the case of push operation (driving or braking on a downhill slope). Thus, it is also possible to consider the intensity of the driver's request.

In addition, it is also possible that the driver terminates the hold gear function by himself. As compared to a special switch, the return operation handling offers hereby essential, extended, and more comfortable options. Therefore, it is proper to terminate the hold gear function, if a new, meaning a different request goes to the transmission, or the vehicle, respectively, issued by the driver. Such a driver's request, for example, can adjust the actual gear, like touching lightly the gear selector lever, once or repeatedly, in the plus or minus direction, to sequentially upshift or downshift the transmission. Also, an automatic mode can explicitly be requested. The driver's requirements show the transmission control directly the driver's request, which terminates still the active hold gear function, followed by the corresponding, automatic, deactivation of the hold gear function.

Another request by the driver can be submitted through changing the driving direction, for instance signaled by activation of the switch of the direction indicator, or through a steering angle sensor. Another driver's requirement can be a kick down, meaning to press the accelerator pedal down fast for activating the kick down switch, usually followed by the transmission shifting to the next lower gear position.

When renewing the request for the hold gear function, two options exist. On one hand, the transmission control can be adjusted in a way, so that a renewed driver's requirement for the hold gear function is interpreted as an immediately effective return condition.

It is also possible, in case of a renewed driver's request of hold gear, to extend the time span for the hold gear function, meaning to delay the return condition. This can be achieved by resetting the timing counter, meaning again starting the time span, or by an increase of the timing counter's time span through a predefined increment. In the last mentioned version, the driver can advantageously extend the hold gear, if it is foreseeable that the regular time span of the function is not sufficient.

Also, it may be provided to deactivate the hold gear function, if a temporary operating condition, for which the hold gear function was requested, has been completed. If the driver intends to control a temporary situation through the hold gear function, for instance no shifting when driving up hill or downhill, one can assume that, at terminating the operating condition, or change to another operating condition, respectively, the initiating situation to hold gear, therefore the driver's request, have ended.

If the hold gear function, as an example, has been activated under a pull condition, it will be terminated when a push condition arises, which can be signaled, for instance, that there is no drive pedal activation but maybe the brake activation occurs. However, if the hold gear function had been activated during the push operation, it will be terminated if pull conditions arise, for instance signaled by not having the brake activation anymore, but a drive pedal activation occurs. Thus, the hold gear function can be applied effectively and properly while driving uphill/downhill. In addition, the hold gear function is not applied unnecessarily and terminated in a comfortable manner, when changing between uphill and downhill driving, and driving level, meaning on the same plane.

Further, it is advantageous to provide, for a start-up operation, certain measures regarding the hold gear function. In particular, it can be provided to deactivate the hold gear function in a start-up situation, if the plausibility test shows that the gear actually held by the driver's request is not suitable for the start-up situation.

If the hold gear function was activated while driving and if the selected gear is not a suitable start-up gear, then, either after a stop or at stopping, respectively, and although being in the hold gear function, an automatic start-up shifting has to be performed. For example, the start-up in a fixed gear might be improper, to prevent the danger of excessive wear or even damage of the clutch, or transmission, respectively. The specified gear might be too large, so that the gear ratio completely prevents a start-up, without stalling the engine. In these cases, the transmission control initiates at least a change to a suitable start-up gear.

To the contrary, it can be provided to prioritize the actually held gear, in a start-up situation, if a plausibility check defines that this gear is suitable for the start-up procedure. Hereby and when stopping, a continued hold gear request might be sustained also during start-up. Thus, the hold gear function remains active, consequently staying in the start-up gear. All avoidable gear positions will be suppressed.

Also possible is a principle deactivation of the hold gear function, which was activated while driving, takes place as soon as the vehicle stops.

Finally, it is also possible to limit at a start-up procedure a range of the upper automatic gears to a gear, at which the hold gear function was activated. In this case, all requested gear shifts, submitted by the transmission control while in automatic mode, will be executed under the consideration of the gear limiting.

To adjust the return condition for the different operating conditions, available in a practical drive situation, in which the use of the hold gear function can be advantageous, possibly sensitive, safe to operate and comfortable, a person who is skilled in the art will combine, in a useful manner, either individually or together, the above mentioned criteria, unless they exclude one another.

The invention claimed is:

1. A method of controlling an automatic transmission of a vehicle, in which a hold gear function is activated by a driver request and deactivated depending on a return condition, the method comprising the step of:
   when the driver signals the request for the hold gear function, activating the hold gear function with a transmission control unit to prevent a gear shift;
   upon activation of the hold gear function, if the vehicle is in one of a push condition or a pull condition, defining one of the push condition and the pull condition as a temporary operating state of the vehicle and defining another of the push condition and the pull condition and vehicle travel on level ground as a termination condition;
   maintaining the hold gear function as long as the temporary operating state of the vehicle is present;
   determining the return condition if the termination condition occurs; and
   deactivating the hold gear function if the return condition occurs.

2. The method according to claim 1, further comprising the steps of
   using driving downhill as the push condition and driving uphill as the pull condition,
   when the temporary operating state is driving uphill, then defining the termination of the temporary operating state once the vehicle drives on level ground or drives downhill, and
   when the temporary operating state is driving downhill, then defining termination of the temporary operating state once the vehicle drives on level ground or drives uphill.

3. The method according to claim 1, further comprising the steps of
   if the hold gear function is activated during a push condition, then the return condition is present with the pull condition occurs, and
   if the hold gear function is activated during a pull condition, then the return condition is present with the push condition occurs.

4. The method according to claim 1, further comprising the steps of
   signaling the end of the push condition by one of (1) activation of a brake and (2) absence of any activation of a drive pedal, and
   signaling the end of the pull condition by one of (1) activation of the drive pedal and (2) without any activation of the brake.

5. The method according to claim 1, further comprising the step of down shifting to a lower gear after the temporary operating state terminates.

6. A method of controlling an automatic transmission of a vehicle, in which a hold gear function is activated by a driver request and deactivated depending on a return condition, the method comprising the step of:
   activating the hold gear function, via a transmission control unit, to prevent a gear shift, when the driver signals the request for the hold gear function;
   upon activation of the hold gear function, determining if the vehicle is traveling one of uphill or downhill,
   maintaining the hold gear function as long as the vehicle continues to travel one of uphill or downhill; and
   only deactivating the hold gear function if one of the following occurs:
   (a) the vehicle begins traveling on level ground,
   (b) the vehicle begins traveling downhill, if the vehicle was traveling uphill when the hold gear function was activated, or
   (c) the vehicle begins traveling uphill, if the vehicle was traveling downhill when the hold gear function was activated.

* * * * *